United States Patent
Laplante

(10) Patent No.: US 7,753,377 B2
(45) Date of Patent: Jul. 13, 2010

(54) SHAFT SEAL HAVING SHAFT OFFSET COMPENSATING CAPABILITY

(75) Inventor: Robert P. Laplante, Gilford, NH (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 404 days.

(21) Appl. No.: 11/668,228

(22) Filed: Jan. 29, 2007

(65) Prior Publication Data

US 2008/0179835 A1 Jul. 31, 2008

(51) Int. Cl.
*F16J 15/32* (2006.01)
(52) U.S. Cl. .................. 277/572; 277/569; 277/573; 277/577
(58) Field of Classification Search .......... 277/551, 277/569, 572, 573, 574, 576, 577
See application file for complete search history.

(56) References Cited

U.S. PATENT DOCUMENTS

| | | | | |
|---|---|---|---|---|
| 2,227,771 A * | 1/1941 | Victor et al. | ............... | 277/569 |
| 2,289,659 A * | 7/1942 | Kosatka | ............... | 277/576 |
| 2,466,533 A * | 4/1949 | Chambers, Jr. | ............... | 277/577 |
| 3,239,281 A * | 3/1966 | White | ............... | 384/299 |
| 4,278,261 A * | 7/1981 | Miura et al. | ............... | 277/574 |
| 4,300,778 A | 11/1981 | Gagne | | |
| 4,304,414 A * | 12/1981 | Forch | ............... | 277/575 |
| RE33,715 E * | 10/1991 | Miura | ............... | 188/322.17 |
| 5,332,234 A * | 7/1994 | Forch et al. | ............... | 277/576 |
| 5,611,548 A * | 3/1997 | Dahlhaus | ............... | 277/574 |
| 6,517,082 B2 * | 2/2003 | Yamada et al. | ............... | 277/559 |
| 6,840,521 B2 * | 1/2005 | Ikeda | ............... | 277/551 |
| 7,025,357 B2 | 4/2006 | Spain et al. | | |
| 2002/0185822 A1* | 12/2002 | Spain et al. | ............... | 277/569 |
| 2006/0290069 A1* | 12/2006 | Ikeda | ............... | 277/551 |

* cited by examiner

*Primary Examiner*—Thomas B Will
*Assistant Examiner*—Gilbert Y Lee
(74) *Attorney, Agent, or Firm*—Ronald W. Wangerow; Harness, Dickey & Pierce, P.L.C.

(57) ABSTRACT

A shaft seal includes an elastomeric annular body having a radially inwardly protruding annular lip. An annular outer case receives the elastomeric annular body. An annular inner case is embedded into the elastomeric annular body. An annular insert is positioned adjacent the inner case. A backup/support insert is received in a recessed pocket in the elastomeric body and outboard of an axially extending annular bead protruding from the body and compressed sealingly against the radially inward extending leg of the seals annular outer case. The backup/support insert and axially extending annular bead act to prevent sealed fluid pressure from acting against a rind portion of the elastomeric body thus leaving outwardly extending beads of the rind portion free to compress or decompress to accommodate eccentric deflection of the shaft. The outer case, the insert, the backup insert and the inner case support the lip and compensate for shaft offset.

25 Claims, 1 Drawing Sheet

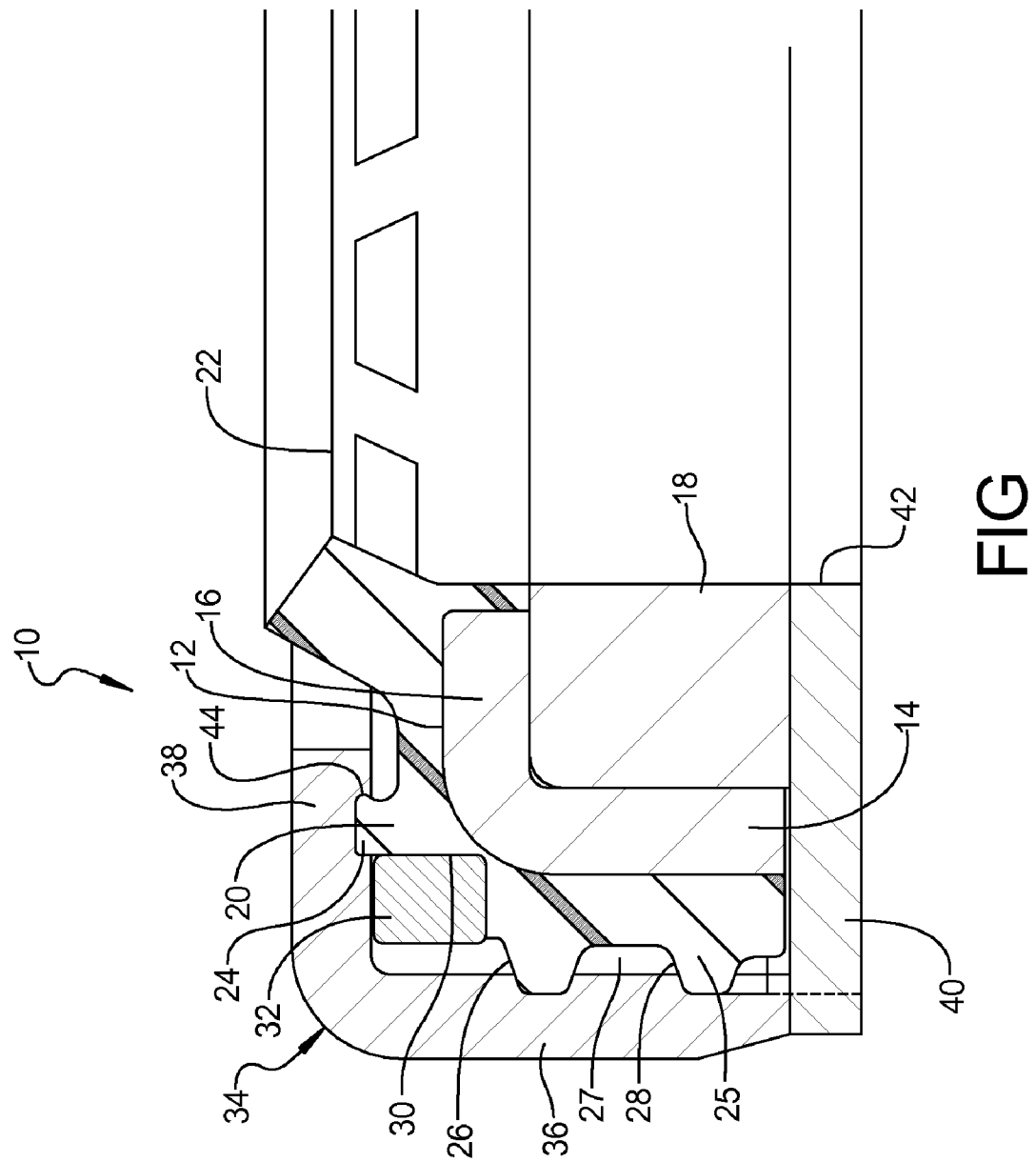

SHAFT SEAL HAVING SHAFT OFFSET COMPENSATING CAPABILITY

FIELD

The present disclosure relates to seals for use in sealing a lubricant about a rotating element, such as a shaft. More specifically, the disclosure relates to a shaft seal of the type having a flexible lip that contacts the rotating shaft.

BACKGROUND AND SUMMARY

The statements in this section merely provide background information related to the present disclosure and may not constitute prior art.

In a typical shaft seal, a flexible lip protrudes outwardly from an elastomeric body to form a lip seal for sealing about a rotating shaft. A lip seal retains lubricant on an oil side of the seal and prevents the entry of contaminants from an air side of the seal.

A lip of such a shaft seal is subjected to bending loads and stresses, which reduce the life of the lip. Oftentimes, the lip is integrally molded with the body from an elastomeric material such as rubber.

The present disclosure includes a shaft seal having a lip. A plurality of supports are provided to support the lip and increase its effective life. An outer case, an insert, a backup insert and an inner case are provided to provide lip supports.

In a preferred embodiment, a shaft seal includes an annular inner case having an axially extending leg and a radially extending leg extending radially inwardly from an end of said axially extending leg; an inner annular insert positioned radially inside of said axially extending leg of said inner case; an elastomeric annular body overmolded to said inner case and including a radially inwardly protruding annular lip, an axially extending annular bead and at least one radially outwardly extending annular bead; a backup annular insert received in an annular pocket in a radially outer surface of said elastomeric annular body; and an annular outer case having an axially extending leg disposed against said at least one radially outwardly extending annular bead of said elastomeric annular body and a radially inwardly extending leg disposed against said axially extending annular bead of said elastomeric annular body.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

The FIGURE is a sectional, partial view of a shaft seal according to the present disclosure.

DETAILED DESCRIPTION

The following description is merely exemplary in nature and is not intended to limit the present disclosure, application, or uses.

With reference to the accompanying FIGURE, the shaft seal 10, according to the principles of the present disclosure, will now be described. The shaft seal 10 includes an annular inner case 12 having an axially extending leg 14 and a radially extending leg 16 extending radially inward from an end of the axially extending leg 14. An annular inner insert 18 is positioned radially inside of the axially extending leg of the inner case adjacent to the radially extending leg 16. The inner annular insert 18 directly abuts the axially extending leg 14 and the radially extending leg 16 of the annular inner case 12, as shown in the FIGURE. An elastomeric annular body 20 is overmolded to the inner case 12 and includes a radially inward protruding lip 22, an axially extending annular bead 24, and a pair of radially outwardly extending beads 26, 28 extending from a rind portion 25. A gap 27 is provided between the beads 26, 28 and can have a volume larger than the volume of the beads 26, 28. The elastomeric annular body 20 includes a recessed annular pocket 30 which receives a backup/support annular insert 32. The annular pocket 30 is provided in a radially outer surface of the elastomeric annular body 20 and is disposed at a location adjacent to an intersection between the axially extending leg 14 and radially extending leg 16 of the inner case 12.

An annular outer case 34 has an axially extending leg 36 disposed against the radially outwardly extending annular beads 26, 28 of the elastomeric annular body 20 and a radially inward extending leg 38 disposed against the axially extending annular bead 24 of the elastomeric annular body 20.

A backup washer 40 is disposed against a free end of the axially extending leg 36 of the outer case 34 and against the inner annular insert 18. The backup washer 40 has an inner diameter opening 42 which is slightly larger than the outer diameter of the shaft. The backup washer 40 has an outer diameter which is smaller than the outer diameter of the outer case 34.

The inner case 12, outer case 34, backup washer 40 and backup insert 32 are each preferably made from metal, although other rigid materials can be utilized. The inner insert 18 is preferably formed from a low friction material such as polytetrafluoroethylene (PTFE) or other similar material that features low load bearing characteristics and low coefficient of friction. The insert 18 includes a first inner cylindrical surface that engages a shaft. As illustrated, inner insert 18 has a generally rectangular cross-section, although other shapes can also be utilized.

The backup/support annular insert 32, as shown, has a generally rectangular cross-section, although other cross sections can be utilized. The outer diameter of the backup/support annular insert 32 is smaller than an inner diameter of the axially extending leg 36 of the outer case 34 so as to provide a gap therebetween. The backup/support insert 32 is disposed adjacent to the axially extending bead 24 of the elastomeric body 20.

The axially extending bead 24 of the elastomeric body 20 is compressed against the radially extending leg 38 of the outer case 34 and the radially extending beads 26, 28 of the elastomeric body 20 are compressed against the axially extending leg 36 of the outer case 34 in order to provide a static sealed relationship therebetween. The axially extending bead 24 has an inwardly angled inner surface 44 which can energize the bead 24 when under pressure to provide improved sealing under pressure. The angled surface 44 extends radially innermost at a distal end of the bead 24. The backup/support insert 32, although preferably made from metal, can be made from other materials having properties that feature high modulus and high yield strength.

The radial clearance (gap) between the outside diameter of the backup/support insert 32 and the inner diameter of the axially extending leg 36 provides containment when the inboard annular bead is compressed with the outer case and radial containment when the system is pressurized. The backup/support insert 32 prevents elastomer extrusion and shields the outside diameter annular protrusion and annular depressions from system pressurization and allows the assembly to move radially with shaft deflection.

It should be noted that the outer surface of the outer case 34 can be coated to enhance a static sealing capability of the outer case 34 when received within a housing or other support structure. Furthermore, an O-ring may be incorporated to provide a static sealing. There is potential that if an O-ring is incorporated at the joint between the outer casing 34 and the mating housing diameter, a clearance fit could be incorporated, whereas the O-ring would provide a static sealing function and allow for additional radial movement of the assembly.

Typical shaft offset is due to a cantilever effect associated with shaft side loading relative to bearing placement and seal position. The present disclosure incorporates features that desensitize the design to the shaft offset in order to provide a more robust shaft seal assembly.

What is claimed is:

1. A shaft seal comprising:
   an annular inner case having an axially extending leg and a radially extending leg extending radially inwardly from an end of said axially extending leg;
   an inner annular insert positioned radially inside of and directly abutting said axially extending leg of said inner case;
   an elastomeric annular body overmolded to said inner case and including a radially inwardly protruding annular lip, an axially extending annular bead and at least one radially outwardly extending annular bead;
   an annular backup/support insert received in an annular pocket in a radially outer surface of said elastomeric annular body;
   an annular outer case having an axially extending leg disposed against said at least one radially outwardly extending annular bead of said elastomeric annular body and a radially inwardly extending leg disposed against said axially extending annular bead of said elastomeric annular body; and
   a radially extending backup washer having a planar surface disposed directly against a free end of said axially extending leg of said outer case and directly against said inner annular insert, said backup washer having a radially inner end and an opposite radially outer end, wherein said planar surface extends along an entire length of said back-up washer from said radially inner end to said radially outer end.

2. The shaft seal according to claim 1, wherein said backup/support annular insert has an outer diameter that is smaller than an inner diameter of said axially extending leg of said outer case.

3. The shaft seal according to claim 1, wherein said backup washer has an outer diameter smaller than an outer diameter of said outer case.

4. The shaft seal according to claim 1, wherein said backup washer is made from metal.

5. The shaft seal according to claim 1, wherein said at least one radially outwardly extending bead of said elastomeric annular body is compressed against said axially extending leg of said outer case.

6. The shaft seal according to claim 1, wherein said axially extending bead of said elastomeric annular body is compressed against said radially inwardly extending leg of said outer case.

7. The shaft seal according to claim 1, wherein said inner annular insert is made from PTFE.

8. The shaft seal according to claim 1, wherein said annular backup/support insert is made from metal.

9. The shaft seal according to claim 1, wherein said inner case and said outer case are made from metal.

10. The shaft seal according to claim 1, wherein said annular pocket in said elastomeric annular body is disposed adjacent to and radially outboard of an intersection of said axially extending leg and said radially extending leg of said inner case, said annular pocket including a recess in the radially outboard surface of the elastomeric body that has an axially extending wall defining a radially outer surface of the axially extending annular bead and a radial wall intersecting said axially extending wall such that the annular backup/support insert is positioned directly against the axially extending annular bead.

11. The shaft seal according to claim 1, wherein said radially inwardly protruding annular lip of said elastomeric annular body is disposed directly radially inward from said radially inwardly extending leg of said outer case.

12. The shaft seal according to claim 1, wherein said axially extending annular bead has an inwardly angled inner surface.

13. The shaft seal according to claim 12, wherein said inwardly angled inner surface extends radially inwardly from a distal end of the axially extending annular bead, such that the distal end has a larger width in a radial direction than a proximal end adjacent to the elastomeric body.

14. The shaft seal according to claim 1, wherein said inner annular insert is directly abutting said axially extending leg and said radially extending leg of said annular inner case.

15. A shaft seal comprising:
   an annular inner case having an axially extending leg and a radially extending leg extending radially inwardly from an end of said axially extending leg;
   an inner annular insert positioned radially inside of and directly abutting said axially extending leg of said inner case;
   an elastomeric annular body overmolded to said inner case and including a radially inwardly protruding annular lip and at least one radially outwardly extending annular bead;
   an annular backup/support insert received in an annular pocket in a radially outer surface of said elastomeric annular body;
   an annular outer case having an axially extending leg disposed against said at least one radially outwardly extending annular bead of said elastomeric annular body; and
   a radially extending backup washer having a planar surface disposed directly against a free end of said axially extending leg of said outer case and directly against said inner annular insert, said backup washer having a radially inner end and an opposite radially outer end, wherein said planar surface extends along an entire length of said back-up washer from said radially inner end to said radially outer end.

16. The shaft seal according to claim 15, wherein said annular backup/support insert has an outer diameter that is smaller than an inner diameter of said axially extending leg of said outer case.

17. The shaft seal according to claim 15, wherein said backup washer has an outer diameter smaller than an outer diameter of said outer case.

18. The shaft seal according to claim 15, wherein said backup washer is made from metal.

19. The shaft seal according to claim 15, wherein said at least one radially outwardly extending bead of said elastomeric annular body is compressed against said axially extending leg of said outer case.

20. The shaft seal according to claim 15, wherein said inner annular insert is made from PTFE.

21. The shaft seal according to claim 15, wherein said annular backup/support insert is made from metal.

22. The shaft seal according to claim 15, wherein said inner case and said outer case are made from metal.

23. The shaft seal according to claim 15, wherein said annular pocket in said elastomeric annular body is disposed adjacent to and radially outboard of an intersection of said axially extending leg and said radially extending leg of said inner case, said annular pocket including a recess in the radially outboard surface of the elastomeric body that has an axially extending wall defining a radially outer surface of the axially extending annular bead and a radial wall intersecting said axially extending wall such that the annular backup/support insert is positioned directly against the axially extending annular bead.

24. The shaft seal according to claim 15, wherein said at least one radially outwardly extending annular bead of said elastomeric annular body includes a pair of beads having a gap therebetween.

25. The shaft seal according to claim 15, wherein said inner annular insert is directly abutting said axially extending leg and said radially extending leg of said annular inner case.

* * * * *